United States Patent

Kyuma et al.

Patent Number: 5,351,080
Date of Patent: Sep. 27, 1994

[54] COLOR TEMPERATURE CONTROL BY COMPARING CHROMINANCE SIGNALS WITH REFERENCE LEVELS

[75] Inventors: Kenji Kyuma; Teruo Hieda; Kazunori Masuda, all of Kanagawa; Hirohumi Takei, Tokyo, all of Japan

[73] Assignee: Canon Kabushiki Kaisha, Tokyo, Japan

[21] Appl. No.: 923,305

[22] Filed: Jul. 31, 1992

Related U.S. Application Data

[63] Continuation of Ser. No. 672,750, Mar. 21, 1991, Pat. No. 5,153,713.

[30] Foreign Application Priority Data

| Feb. 21, 1986 | [JP] | Japan | 61-037714 |
| Apr. 30, 1986 | [JP] | Japan | 61-098049 |
| Jan. 22, 1987 | [JP] | Japan | 62-011412 |
| Feb. 9, 1987 | [JP] | Japan | 62-026239 |

[51] Int. Cl.[5] .................................. H04N 9/73
[52] U.S. Cl. ................................ 348/225; 348/227
[58] Field of Search ................ 358/75, 80, 41, 43, 358/44, 29, 515, 516; 348/223, 225, 227, 229, 228, 224; H04N 9/73, 1/46

[56] References Cited

U.S. PATENT DOCUMENTS

| 4,395,730 | 7/1983 | Shen | 358/29 |
| 4,584,598 | 4/1986 | Kutaragi | 358/41 |
| 4,739,392 | 4/1988 | Ueda et al. | 358/29 |
| 4,931,856 | 6/1990 | Hieda et al. | 358/44 |
| 5,153,713 | 10/1992 | Kyuma et al. | 358/29 |

Primary Examiner—Edward L. Coles, Sr.
Assistant Examiner—Kim Yen Vu
Attorney, Agent, or Firm—Robin, Blecker, Daley & Driscoll

[57] ABSTRACT

A color temperature information forming device has converting means of a plurality of kinds arranged to obtain chrominance signals of a plurality of different kinds by photoelectric converting rays of light of different wave length zones included in an incident light and to accumultate and produce the plurality of chrominance signals. The device detects the level of at least one kind of the chrominance signal among the chrominance signals of the plurality of kinds produced from the plurality of converting means and forms color component information according to the detected level.

8 Claims, 14 Drawing Sheets

COLOR TEMPERATURE CONTROL BY COMPARING CHROMINANCE SIGNALS WITH REFERENCE LEVELS

This application is a continuation of application Ser. No. 672,750, filed Mar. 21, 1991, which is U.S. Pat. No. 5,153,713.

BACKGROUND OF THE INVENTION

1. Field of the Invention

This invention relates to a color temperature information forming device for forming information on color temperature.

2. Description of the Related Art

White balance has been an important subject of signal adjustment for color television cameras. The ratio of three primary color components red (R), green (G) and blue (B) included in the illumination of an object to be photographed greatly varies with the kind of the illumination. The white balance adjustment is performed for varying the chrominance signals of the camera to have these primary color components in the ratio of 1:1:1. Inadequate white balance adjustment prevents the color from being reproduced with fidelity as it results in a bluish or reddish tone of the whole television picture.

The white balance must be readjusted every time the illumination of the object changes from one kind to the other. To meet this requirement, various automatic white balance adjustable apparatuses have been proposed for simple and accurate automatic adjustment. Among these apparatuses, some of compact TV cameras and particularly home video cameras has been proposed to be provided with a so-called external automatic follow-up white balance device. This device is arranged to detect the illumination of the object by means or a light receiving system disposed separately from an image pickup or sensing optical system and to adjust the white balance automatically according to the result of detection so that the operator can be relieved from paying attention to white balance adjustment.

According to these proposals, two or three different color components included in the external light of the object are detected by two or three photodetectors such as photo diodes or photo transistors arranged with filters disposed in front of them for these colors. The outputs of these detectors are logarithmically compressed. A difference between the compressed values is obtained and used for equivalently detecting the ratio among the color components of the illumination light. Them, the gains of the color chrominance signal amplifiers of an image pickup signal processing system is controlled in accordance with the detected ratio.

FIG. 1 of the accompanying drawings shows in outline an example of the above stated arrangement of the prior art. The illustration includes color filters 1 and 5; photo diodes 2 and 6; amplifiers 3 and 7; logarithmic amplifiers 4 and 8; and an adder 9. The color filters 1 and 5 have different spectral transmittance characteristics from each other. Light fluxes which pass through the color filters 1 and 5 come to the photo diodes 2 and 6. The outputs of the photo diodes 2 and 6 which correspond to the amount of the transmission light pass through the amplifiers 3 and 7 to be logarithmically amplified by the logarithmic amplifiers 4 and 8. The outputs of the amplifiers 4 and 8 is added up at the adder 9 with the output of the amplifier 8 alone inverted before arrival at the adder. The arrangement is thus capable of obtaining the ratio between the outputs of the photo diodes 2 and 6 as a color temperature detection output. Assuming that the color filters 1 and 5 are arranged to pass red and blue lights, the output of the adder 9 gives a ratio between the red and blue components of the incident light.

In another example of the prior art arrangement, three photo sensors are used with color filters for red, green and blue lights disposed in front of them. Then, a ratio between the red and green components and a ratio between blue and green components are obtained through the same arrangement as in the case of FIG. 1.

The prior art examples given above, however, have necessitated use of many additional circuit elements besides the photo diodes in obtaining, for example, the ratio between the red and blue components of the external light as shown in FIG. 1. Another shortcoming of the prior art devices of the above stated kind resides in that: Since the illuminance range of the illumination of the object is wide, the logarithmic amplifier is required to have a high degree of precision. Besides, they necessitate some correction circuit for temperature correction or the like. The prior art devices thus result in a complex and expensive arrangement.

SUMMARY OF THE INVENTION

It is a general object of this invention to provide a color temperature information forming device which is capable of eliminating the shortcomings of the prior art devices mentioned in the foregoing.

It is a more specific object of this invention to provide a color temperature information forming device which is capable of forming color temperature information despite of its simple and inexpensive arrangement.

Under this object, a color temperature information forming device arranged to form information on the color temperature of an incident light according to this invention as an embodiment thereof comprises: a plurality of converting means arranged to obtain chrominance signals of a plurality of kinds by photoelectric converting rays of light of different wave length zones included in the incident light and to be capable of accumulating and producing the chrominance signals thus obtained; detecting means for detecting variations of the levels of the chrominance signal produced at least from one of the plurality of converting means; and color component information signal forming means for forming a color component information signal according to the result of detection made by the detecting means.

It is another object of this invention to provide a color temperature information forming device which is capable of forming highly accurate color temperature information with a simple arrangement.

Under that object, a color temperature information forming device arranged to form information on the color temperature of an incident light according to this invention as another embodiment thereof comprises: a plurality of converting means arranged to obtain chrominance signals of a plurality of kinds by photoelectric converting rays of light of different wave length zones included in the incident light and to be capable of accumulating and producing the chrominance signals thus obtained; color component information signal forming means for forming a color component information signal on the basis of at least one of chrominance signals of the plurality of kinds produced from the plurality of the converting means; detecting means for detecting the level of the chrominance signal produced at least from one of the plurality of converting means; and reset signal forming means for forming according to the result of detection made by the detecting means a reset signal for resetting the plurality of chrominance signals accumulated at the plurality of converting means.

It is a further object of this invention to provide a color temperature information forming device which is capable of stably forming information on color temperature over a wide range of illuminance.

Under this object, a color temperature information forming device arranged to form information on the color temperature of an incident light according to this invention as a further embodiment thereof comprises: converting means of a plurality of kinds for receiving rays of light of different wave length zones included in an incident light and for producing chrominance signals at levels corresponding to the incident light respectively; control means for controlling the sensitivity of the plurality of converting means according to the light quantity of the incident light; and color component information signal forming means for forming a color component information signal on the basis of at least one of a plurality of the chrominance signals produced from the plurality of converting means.

Further objects and features of this invention will become apparent from the following detailed description of embodiments thereof taken in connection with the accompanying drawings.

BRIEF DESCRIPTION OF THE DRAWINGS

FIGS. 5(a), 5(b) and 5(c) show by way of example the arrangement of a photoelectric converter shown in FIG. 3. FIG. 5(a) is a schematic plan view of the converter. FIG. 5(c) shows it in an equivalent circuit.

DETAILED DESCRIPTION OF THE PREFERRED EMBODIMENTS

Figure 1:
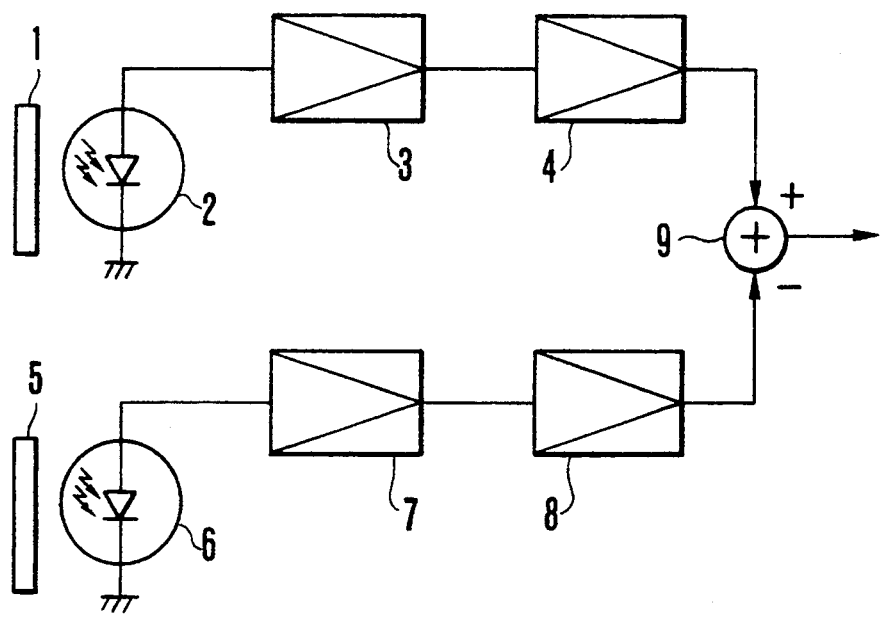
FIG. 1 is a diagram showing in outline the arrangement of the conventional color temperature information forming device.
Figure 2:
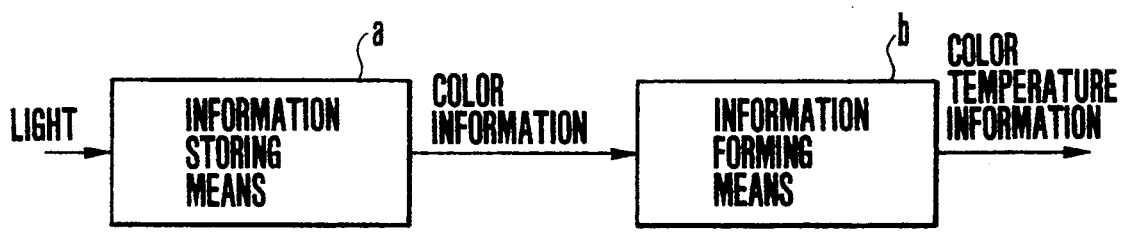
FIG. 2 is a diagram showing the basic arrangement of a first embodiment of this invention.

A first embodiment of this invention is arranged as described in detail below:

FIG. 2 shows the basic arrangement of the first embodiment. In FIG. 2, a block "a" represents information storing means which stores or accumulates a plurality of color information after it is reset. A block "b" represents information forming means which is arranged to form color temperature information corresponding to the plurality of color information stored by the information storing means "a" and according to a length of time elapsing before each of the stored information reaches a predetermined level.

Figure 3:
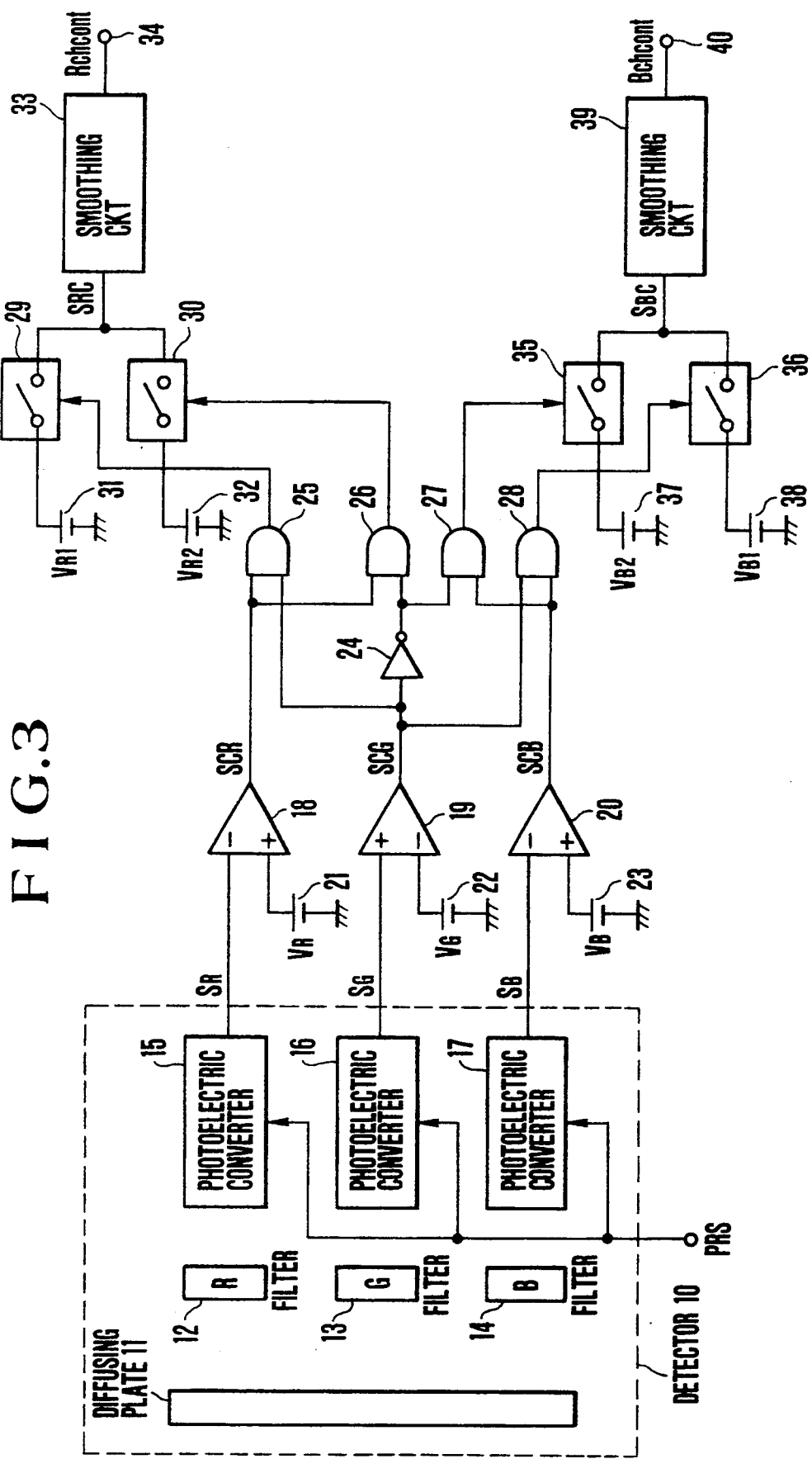
FIG. 3 is a diagram showing the circuit arrangement of the first embodiment of this invention as applied to a white balance adjustment device.

FIG. 3 shows the circuit arrangement of the first embodiment in which this invention is applied to a white balance adjustment device. Referring to FIG. 3, a detector 10 is arranged to detect the illumination of an object (the external light of the object which is not shown). The detector 10 detects color information components by spectrally dividing a light flux received via a light receiving lens system arranged separately from an image pickup optical system. The detector 10 is composed of elements 11 to 17, including: A diffusing plate 11 which is arranged to prevent uneven distribution of color information by diffusing the light passed through the light receiving system; a red (R) filter 12; a green (G) filter 13, a blue (B) filter 14; and integrating type photoelectric converters 15, 16 and 17 which are arranged to serve as information accumulating or storing means as will be described in detail later herein. Further, the photoelectric converters do not have to be the integrating type but may be of some different type having integrators arranged outside of them. They may be any type as long as they are capable of storing color information in response to a resetting action.

Comparators 18, 19 and 20 are arranged to compare the outputs SR, SG and SB of the photoelectric converters 15, 16 and 17 with reference voltages 21, 22 and 23 respectively. A NOT gate 24 is arranged to invert the output SCG of the comparator 19. AND gates 25, 26, 27 and 28 are arranged to perform AND operations on the outputs of the comparators 18, 19 and 20. The logical product of the output SCR of the comparator 18 for the signal SR (red) and the output SCG of the comparator 19 for the signal SG (green) is obtained by the AND gate 25. The logical product of the output SCR of the comparator 18 and the output $\overline{SCG}$ of the NOT gate 24 is obtained by the AND gate 26. The logical product of the output $\overline{SCG}$ of the NOT gate 24 and the output SCB of the comparator 20 for the signal SB (blue) is obtained by the AND gate 27. The logical product of the output SCG of the comparator 19 and the output SCB of the comparator 20 is obtained by the AND gate 28. Switch circuits 29, 30, 35 and 36 are arranged to turn on (close) in response to the output signals of the corresponding AND gates 25, 26, 27 and 28 respectively and to produce given reference voltages VR1, VR2, VB2 and VB1 as applicable. More specifically, the switch circuit 29 turns on to produce the reference voltage VR1 as the signal SRC when the output level of the AND gate 25 is high (hereinafter referred to as H). The switch circuit 30 turns on to produce the reference voltage VR2 as the signal SRC when the output level of the AND gate 26 is at an H level. The switch circuit 35 turns on to produce the reference voltage VB2 when the output of the AND gate 27 is at an H level. The switch circuit 36 turns on to produce the reference voltage VB1 as the signal SBC when the output of the AND gate 28 is at an H level.

A smoothing circuit 33 is arranged to smooth the output signal SRC of the switch circuits 29 and 30. The circuit 33 produces a red channel controlling output (Rchcont) 34. A smoothing circuit 39 is arranged to smooth the output signal SBC of the switch circuits 35 and 36 and to produce a blue channel control output (Bchcont) 40. These control outputs 34 and 40 are supplied to a known white balance circuit which is not shown. Then, white balance adjustment is performed in a known manner.

The first embodiment which is arranged as described above operates as follows: The detector 10 is disposed in a position to be capable of detecting the light of the photographing object and light around it through an optical system arranged separately from the image pickup optical system of a color television camera which is not shown. The light coming from the object and around the object is diffused by the diffusing plate 11 of the detector 10. Then color information on the R, G and B components of the diffused incident light is taken out through the R, G and B filters 12, 13 and 14 respectively. The photoelectric converters 15, 16 and 17 then photoelectric converts the applicable color components respectively. The converters 15, 16 and 17 perform their storing actions. Namely, after they are initialized by a reset signal, they integrate the electric charge obtained by the photoelectric converting action of the converters 15, 16 and 17. The outputs SR, SG and SB of the photoelectric converters 15, 16 and 17 are supplied to applicable comparators 18, 19 20, which have their other input terminals arranged to receive reference voltages 21, 22 and 23. The comparator 19 is arranged to produce its output at a low (hereinafter referred to as L) level when the level of the output of the photoelectric converter 16 is lower than a reference voltage VG and at an H level when the former is higher than the latter. Other two comparators 18 and 20 operate in a manner contrary to the operation of the comparator 19:. In other words, they produce outputs SCR and SCB at H levels when the outputs of the photoelectric converters 15 and 17 are at lower levels than their applicable reference voltages VR and VB and at L levels when the former is higher than the latter.

The NOT gate 24 and the AND gates 25, 26, 27 and 28 are arranged to control the ON and OFF actions of the switch circuits 29, 30, 35 and 36. The switch circuits 29 and 30 either allow or not allow reference voltages 31 and 32 to be produced via the output terminals of the AND gates 25 and 26. The signals produced from the switch circuits 29 and 30 are smoothed by the smoothing circuit 33. The output of the smoothing circuit 33 is produced as a red level control output 34. The red level control output 34 is supplied the gain control input terminal of a red signal processing circuit of the color television camera which is not shown. This input makes the gain of the red signal system variable to permit a white balance adjustment operation.

The switch circuits 35 and 36, the reference voltages 37 and 38 and the smoothing circuit 39 operate in the same manner as the switch circuits 29 and 30, the reference voltages 31 and 32 and the smoothing circuit 33 mentioned above. They produce a blue level control output 40. The control output 40 then makes the gain of the blue signal processing circuit of the color television camera variable to permit white balance adjustment.

Figure 4:
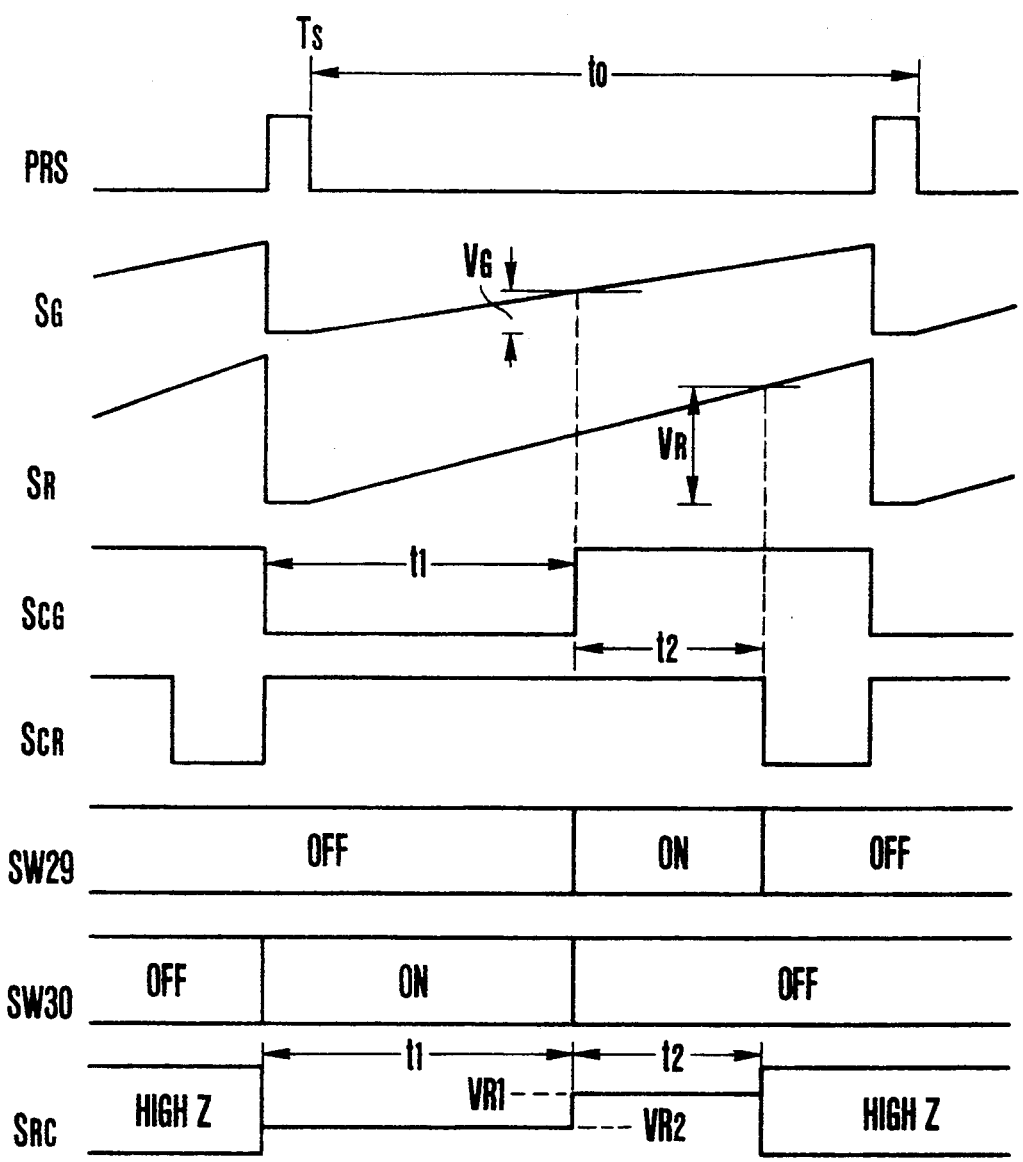
FIG. 4 is a timing chart showing by way of example the operation of the embodiment shown in FIG. 3.

FIG. 4 shows by way of example the operation of the embodiment shown in FIG. 3 in a timing chart. For the sake of simplification of the illustration, the timing chart includes only the red channel Rch. The operation of the blue channel Bch is similar to that of the red channel Rch. Referring to FIG. 4, a reference symbol PRS denotes a reset signal for the photoelectric converters 15 and 16. The reset signal PRS is a pulse signal generated at a given period t0.

A symbol SG denotes the output of the photoelectric converter 16. The output 16 is a voltage corresponding to the integrated value of the incident light. A symbol SR likewise denotes the output of the photoelectric converter 15. A symbol VG denotes the reference voltage 22 for the comparator 19. Symbols SCG and SCR respectively denote the outputs of the comparators 19 and 18. Symbols SW29 and SW30 respectively denote the operating states of the switch circuits 29 and 30. A symbol SRC denotes a signal obtained at a node between the output terminals of the switch circuits 29 and 30.

The photoelectric converters 15 and 16 are first initialized by the reset signal PRS to have their outputs SG and SR set at a zero level and begin to perform their integrating action. When the output SG comes to exceed the reference voltage VG after the lapse of a period of time t1, the level of the oust SCG of the comparator 19 becomes an H level. Following that, when the output SR comes to exceed the reference voltage VR after the lapse of a period of time t2, the level of the output SCR of the comparator 18 becomes an L level.

The reference voltages VG and VR are preset to ensure the following relation under necessary operating conditions including the color temperature range of illumination and the range of illuminance:

$$t1>0, \ t2>0, \ t1+t2<t0$$

For example, the reference voltages VR and VB are set at the white level of the photoelectric converters 15 and 17 and to be $VR=VB$, $VG \approx VR/2$.

The outputs SCG and SCR of the comparators are allowed to pass the NOT gate 24 and the AND gates 25 and 26 and are applied to the switch circuits 29 and 30. The switch circuits (SW 29 and SW 30) then operate as shown in FIG. 4. In other words, the SW 29 turns off and the SW 30 turns on when the comparator output SCG is at an L level and the other comparator output SCR at an H level. The SW 29 is on and the SW 30 off when the output SCG is at an H level and the output SCR is also at an H level. The SW 29 is off and the SW 30 off when the output SCG is at an H level and the output SCR at an L level. An input signal SRC of the smoothing circuit 33 is in a high impedance state (HIGH Z) when the SW 29 is off and the SW 30 off. The input signal SRC is changed over to a state of VR1 when the SW 29 is off and the SW 30 on and over to a state of VR2 when the SW 29 is on and the SW 30 off. Since the time constant of the smoothing circuit 33 is long, the circuit 33 has no current flow in or out under the condition of HIGH Z. In that event , therefore, the circuit 33 keeps a voltage obtained immediately before the condition of HIGH Z and then produces an average value according to the periods of time t2 and t1 when it is in the states of VR1 and VR2. The voltages VR1 and VR2 are set to be in a relation of VR2<VR1 and, for example, VR2≈VR1/2.

Further, if the illumination is in a white state requiring no adjustment, the time t1 is equal to t2.

Assuming that the quantity of light incident on the photoelectric converter 15 is LR, that of light incident on the photoelectric converter 16 is LG, their conversion coefficients are AR and AG respectively and, in FIG. 4, t=0, there obtains the following relation:

$$SG = LG \times AG \times t$$

$$SR = LR \times AR \times t$$

$$t1 = \frac{VG}{LG \times AG}$$

$$t2 = \frac{VR}{LA \times AR} - t1$$

$$Rchcont = \frac{t1 \times VR1 + t2 \times VR2}{t1 + t2} \quad (1)$$

$$= K \frac{LR}{LG}(VR1 - VR2) + VR2$$

wherein $$K = \frac{VG \times AR}{VR \times AG}$$

Formula (1) above indicates that the voltage value of the red channel control output varies from the value of the reference voltage VR2 to that of another reference voltage VR1 according to the ratio between the R and G components of the incident light.

FIGS. 5(a), 5(b) and 5(c) show an example of arrangement of the photoelectric converters 15, 16 and 17 shown in FIG. 3. FIG. 5(a) schematically shows it in plan view. FIG. 5(b) shows it in a sectional view taken on a line A—A' of FIG. 5(a). FIG. 5(c) shows it in an equivalent circuit. These illustrations include a substrate 101 of an n type silicon semiconductor; an insulating protection film 102; a silicon oxide film 103; an element separating area 104; an n− collector area 105 formed by an epitaxial growth process or the like; a p type base area 106 formed also by the epitaxial growth process or the like; an n+ emitter area formed also by the epitaxial growth process or the like; an emitter electrode 108; a capacitor electrode 109; a reset line 110; an n+ area 111 for ohmic contact; a collector electrode 112; a bias power supply 113; an output terminal 114 of the photoelectric converter; a reset transistor 115; and a reset terminal 116. The photoelectric converter is electrically isolated on the substrate 101 by the element separating area 104 and is composed of a bipolar transistor which consists of the n− collector area 105, the base area 106 and the emitter area 107 and the capacitor electrode 109 which is arranged to control the potential of the base area 106 across the silicon oxide film 103.

When a reset signal PRS which is of a positive voltage is applied to the reset terminal 116, the reset transistor 115 turns on. The emitter side is grounded by this. A positive voltage is applied via the reset line 110 to the capacitor electrode 109. As a result, the capacitor electrode 109 is capacitor connected via the silicon oxide film 103 to the base area 106. A current then flows in the order of the bias power supply—the n+ area 111—the substrate 101—the n− collector area 105—base area 106—the emitter area 107 and emitter electrode 108—the reset transistor 115—the ground.

After that, when the electric charge accumulated in the base area 106 completely disappears, the flow of current comes to a stop. At this moment, the base area 106 is at a potential VBO, which can be expressed:

$$VBO = VSDSAT + VBE$$

wherein VSDSAT represent the saturation voltage of the reset transistor 115 and VBE the forward voltage of the base emitter of the element (picture element).

Upon completion of the supply of the reset signal PRS, the potential VB1 of the base area 106 becomes:

$$VB1 = VBO - VR,$$

wherein VR represents the crest value of the reset signal (a reset action).

A carrier produced from the incident light is biased to the initial potential as mentioned above and is accumulated in the base area 106 which is in a floating state (a storing action). A positive voltage is applied to the capacitor electrode 109 to bias the voltage between the emitter and the base in the forward direction. The stored voltage which is produced by the carrier accumulated is read out toward the emitter which is in a floating state. The stored voltage is then produced via the emitter electrode 108 to the output terminal 114 of the photoelectric converter (a reading action). The output Vo from this terminal 114 can be expressed as follows:

$$Vo = VB1 + V_v - VBE \quad (2)$$

wherein $V_v$ represent a voltage obtained from the carrier produced by the incident light.

The signal output from the output terminal 114 of the photoelectric converter is supplied to one of the comparators 18, 19 and 20 as applicable. If the input impedance of the comparator is sufficiently high, the carrier does not flow out from the output terminal 114 of the photoelectric converter. Therefore, the voltage of Formula (2) above can be read out. Further, the photoelectric converter of the kind as shown in these drawings is generally called a base store image sensor (hereinafter referred to as BASIS) or an integrating type photoelectric converter.

Figure 6:
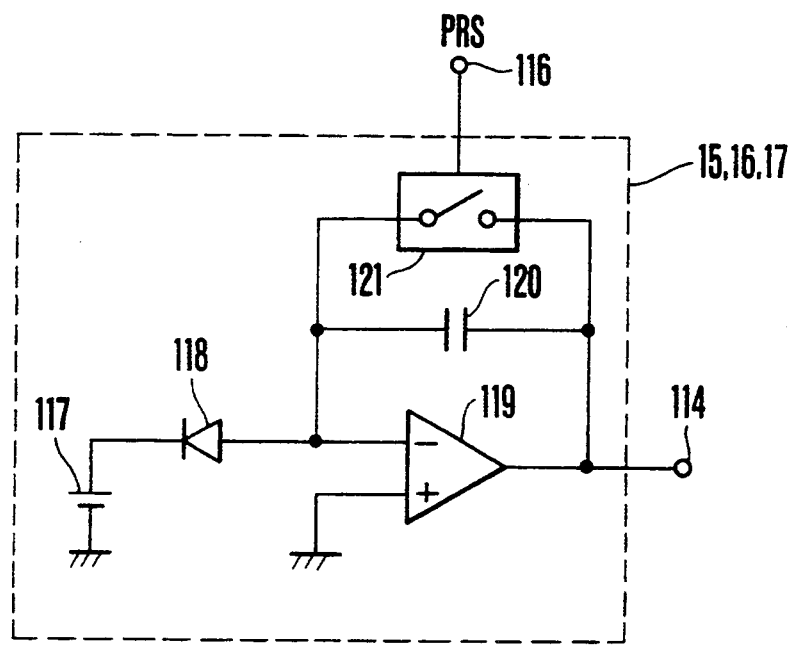
FIG. 6 is a diagram showing another example of arrangement of the photoelectric converter of FIG. 3.

FIG. 6 shows another example of a photoelectric converter which is usable also in accordance with this invention. The illustration includes as power supply 117; a photo diode 118; an operational amplifier 119; an integrating capacitor 120; and a reset switch 121.

Referring to FIG. 6, the reset switch 121 closes upon receipt of the reset signal PRS from a reset terminal 116 to cause the terminal voltage of the integrating capacitor 120 to be short circuited and discharged. Upon completion of supply of the reset signal PRS, the reset switch 121 opens. Then, a photo current corresponding to the light incident on the photo diode 118 is stored via the photo diode 118 from the bias power supply 117 at the integrating capacitor 120. The stored current is produced from the output terminal 114 of the photoelectric converter. This invention can be practiced with the photoelectric converter of FIG. 6.

In the embodiment described, the R, B and G components of the light coming from around the object are arranged to be detected. However, this invention is not limited to this arrangement. In accordance with the invention, the device can be arranged to detect 2 or 4 or more than 4 color components.

The embodiment is arranged to form color temperature information according to the period of time required before each of a plurality of color information accumulated by the information storing or accumulating means for accumulating the plurality of color information reaches a given level after the accumulating means is reset. Therefore, the color temperature information forming device embodying this invention is capable of highly accurately operating with simple arrangement and can be prepared at a low cost.

The following describes a second embodiment of this invention which is using as the photoelectric converter the BASIS shown in FIGS. 5(a) to 5(c).

Figure 7:
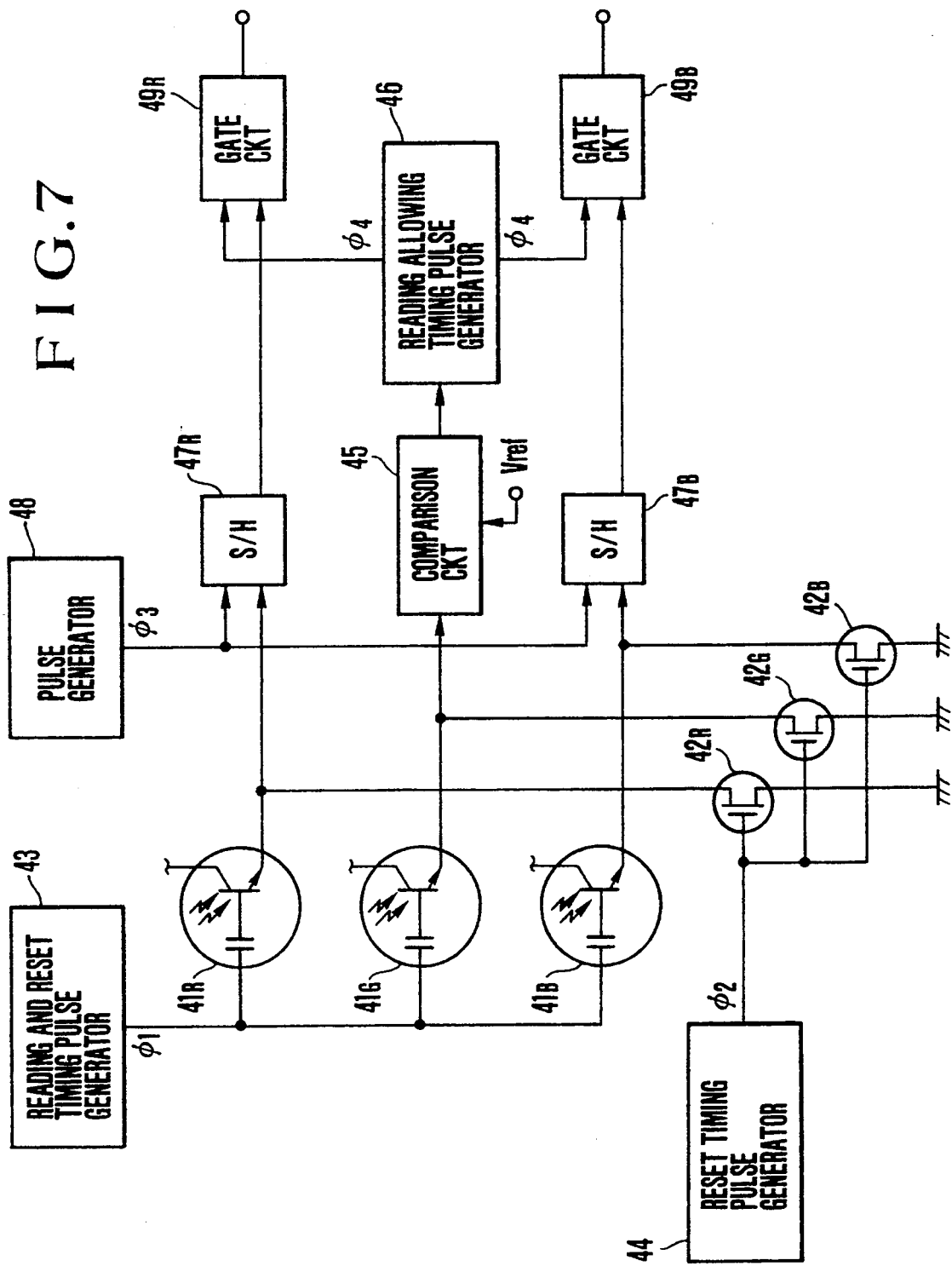
FIG. 7 is a diagram showing a second embodiment of this invention.

FIG. 7 shows the arrangement of the second embodiment. The device includes BASIS's 41R, 41G and 41B. MOSFETs 42R, 42G and 42B are provided for resetting. A timing pulse generator 43 is arranged to generate timing pulses for reading and resetting. A timing pulse generator 44 is arranged to generate timing pulses for resetting. A comparison circuit 45 is arranged to make comparison with a reference voltage. A pulse generator 46 is arranged to generate timing pulses for allowing a reading act ion. The embodiment further includes sample-and-hold circuits 47R and 47B; a pulse generator 48 arranged to generate pulses for resetting the sample-and-hold circuits 47R and 47B; and gate circuits 49R and 49B.

Figure 8:
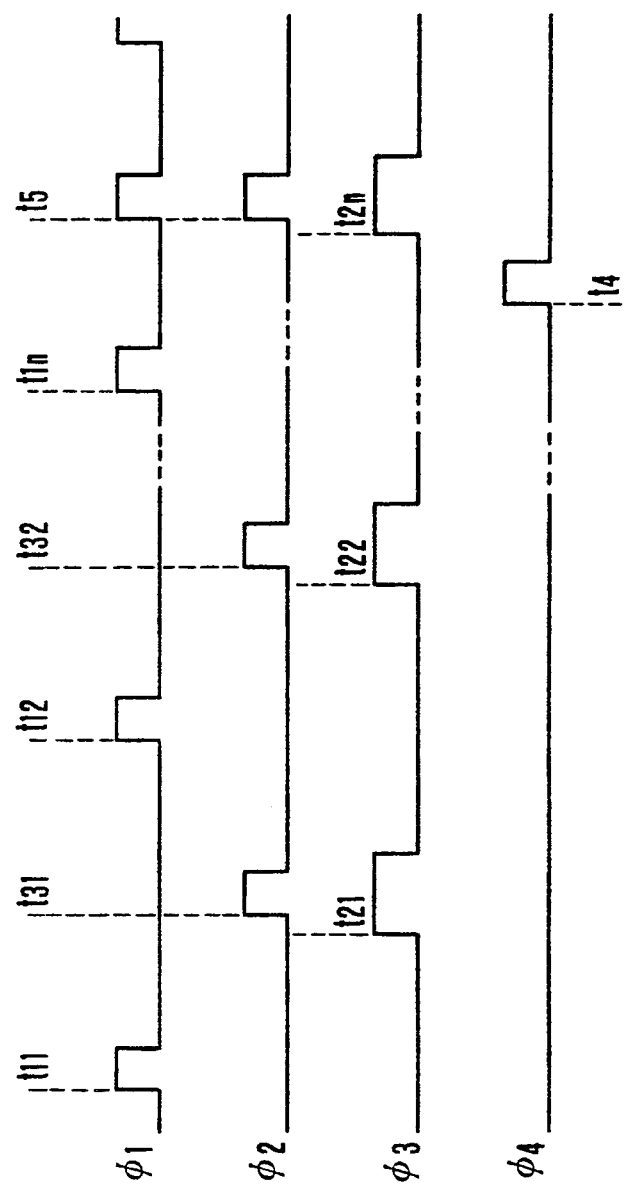
FIG. 8 is a timing chart showing the operation of the circuit of FIG. 7.

FIG. 8 is a timing chart showing the operation timing of the circuit arrangement shown in FIG. 7. In FIG. 8, symbol $\phi 1$ denotes pulses to be used for reading and resetting actions on the BASIS's 41R, 41G and 41B. A symbol $\phi 2$ denotes pulses for the resetting actions of the resetting MOSFETs 42R, 42G and 42B. A symbol $\phi 3$ denotes pulses for resetting the sample-and-hold circuits 47R and 47B. A symbol $\phi 4$ denotes a gate pulse to be used for producing the signals held by the the sample-and-hold circuits 47R and 47B. Filters which are not shown but have different spectral transmission characteristics are disposed on the light receiving surfaces of the BASIS's 41R, 41G and 41B respectively.

The signals stored at the BASIS's 41R, 41G and 41B are read out at points of time t11, t12,—and tln shown in FIG. 8. Assuming that the outputs of the BASIS 41R thus obtained are VR1, VR2,—and VRn, those of the BASIS 41G are VG1, VG2,—and VGn and those of the BASIS 41B are VB1, VB2,—and VBn, the signal obtained from the BASIS 41G at every one of the timing points t11, t12,—and tln among others is compared with a reference voltage Vref at the comparison circuit 45. Then, when the signal VGn becomes larger or equal to the reference voltage Vref, the reading allowing timing pulse generator 46 generates a signal. In the case of this embodiment, the gate circuits 49R and 49B are opened at a timing point t4 to allow the signals VRn and VBn of the sample-and-hold circuits 47R and 47B to be produced from the sample-and-hold circuits 47R and 47B.

Further, in the case of VGn < Vref, the signals within the sample-and-hold circuits 47R and 47B and the signals remaining in the emitter wiring of the BASIS's 41R, 41G and 41B are respectively reset by signals from the reset timing pulse generator 44 at timing points t21, t22,—and t31, t32,—respectively.

With the signals thus having been produced from the sample-and-hold circuits 47R and 47B, the signals of the BASIS's 41R, 41G and 41B and those of their emitter wiring are reset at a timing point t2n and the sample-and-hold circuits 47R and 47B are reset.

Since the signals VRn and VBn are thus arranged to be taken out at a point of time when the signal VGn reaches a given level, in the case of this embodiment, the signals VRn and VBn which are produced from the gate circuits 49R and 49B at the timing point t4 are usable as they are as color temperature detection outputs which are in proportion to VRn/VGn and VBn/VGn.

Figure 9:
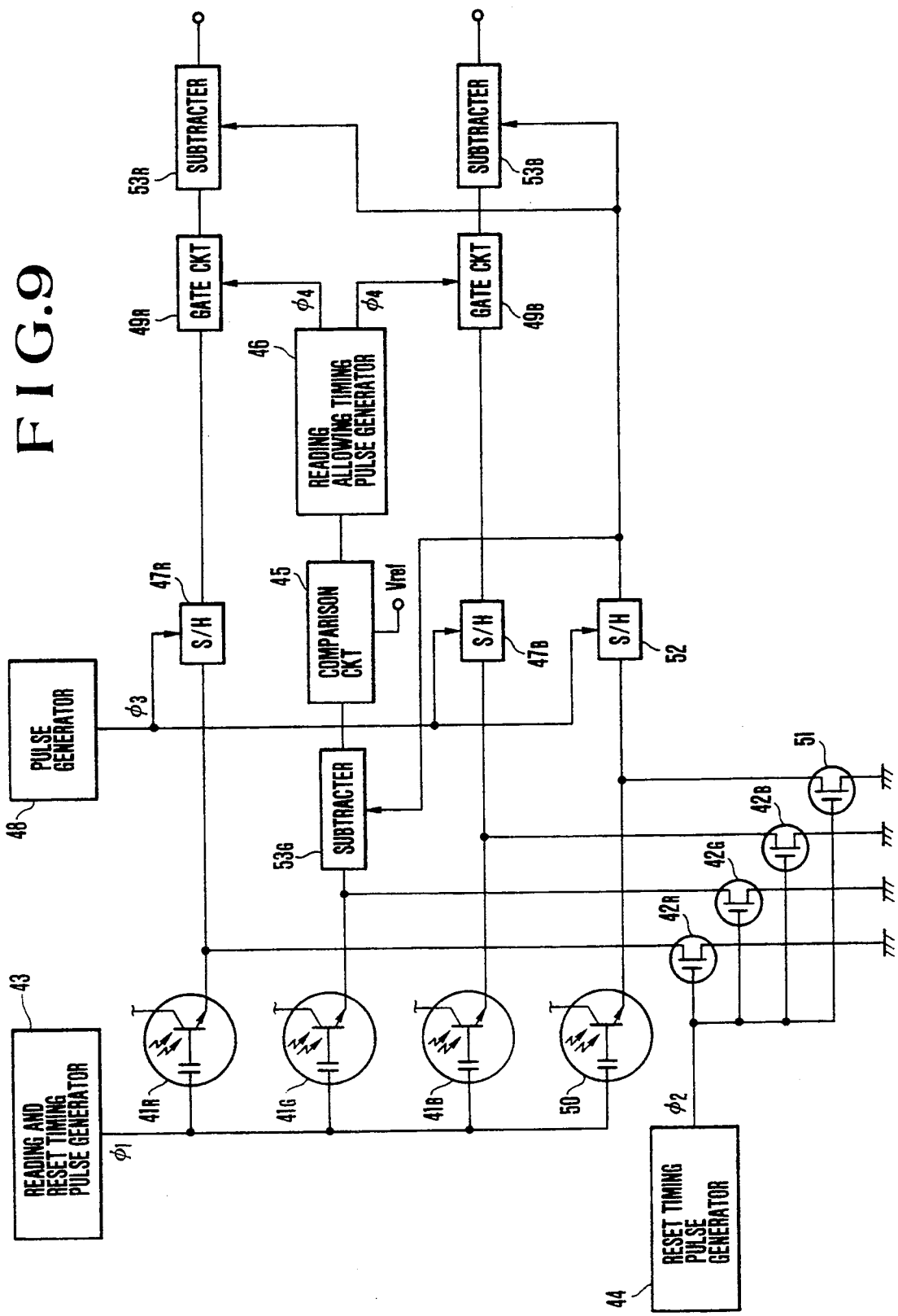
FIG. 9 is a diagram showing a third embodiment of this invention.

FIG. 9 shows a third embodiment of the invention. In FIG. 9, the parts similar to those shown in FIG. 7 are indicated by the same reference numerals and symbols. A BASIS 50 is light shielded. A MOSFET 51 is provided for resetting the BASIS 50. The third embodiment further includes a sample-and-hold circuit 52 and subtracters 53R, 53B and 53G. The operation timing of the third embodiment is similar to the t lining shown in FIG. 8. The light shielded BASIS 50 is provided for detecting a dark voltage generated by heat or the like within the BASIS 50. Therefore, the dark voltage can be subtracted by means of the subtracters 53R, 53B and 53G from signals read out from the BASIS's 41R, 41G and 41B. As a result, the outputs of the gate circuits 53R and 53B which is proportional to VRn/VGn and VBn/VGn can be prevented from being affected by a dark voltage. Further, in this case, the subtracters 55R and 53B may be disposed in front of the sample-and-hold circuits 47R and 47B.

In the second and third embodiments described, the BASIS's are employed as the photoelectric converters. However, in accordance with this invent ion, the photoelectric converter is not limited to the BASIS but may be selected from among other different kinds as long as they are integrating type photoelectric converters. For example, a photo diode may be arranged in combination with a light receiving circuit arranged to constantly read out and integrate the output of the photo diode.

Further, in these embodiments, filters of different spectral transmission characteristics are disposed in front of the light receiving surfaces of the photoelectric converters. However, such filters are not always necessary and are dispensable in cases, for example, where the photoelectric converters are arranged to be sensitive only to rays of light of specific wave length zones. As described in the foregoing, the device according to this invention is capable of detecting the color temperature with a simple arrangement. The embodiment, therefore, permits provision of some additional means. It is another advantage of the embodiment that it is capable accurately detecting the color temperature even in the event of a low degree of illuminance.

Figure 10:
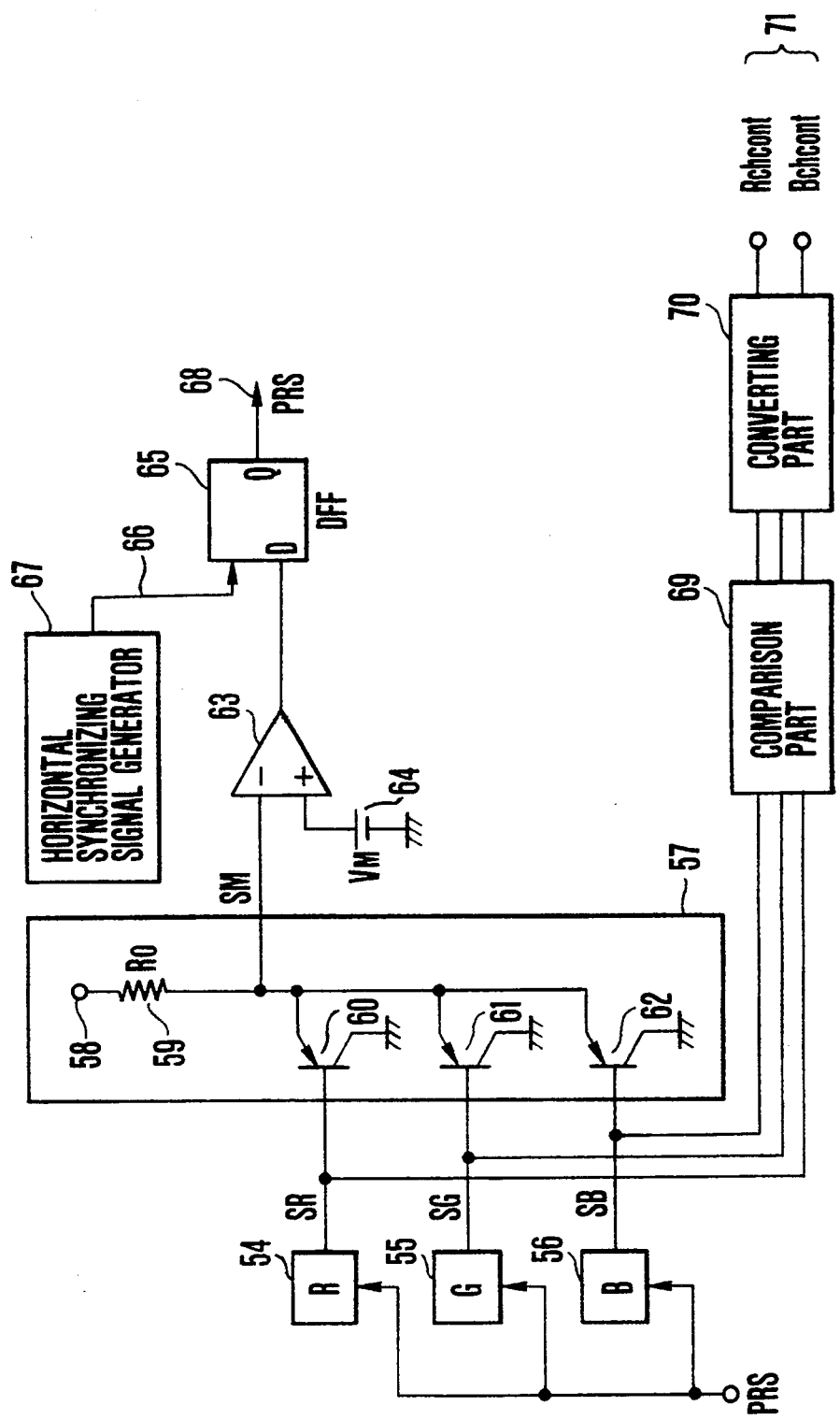
FIG. 10 is a diagram showing a fourth embodiment of this invention.

FIG. 10 shows in outline the arrangement of a fourth embodiment of this invention. The illustration includes photoelectric converters 54, 55 and 56; a minimum value circuit 57; a power supply input terminal 58; a resistor 59; pnp transistors 60, 61 and 62; a comparator 63; a reference voltage 64; a data latch flip-flop (DFF) 65; a clock pulse input terminal 66; a television horizontal synchronizing signal generator 67; a reset pulse output (PRS) 68; the comparison part 69 and the converting part 70 of a color temperature information forming device; and an output terminal 71 for R and B channel control signals Rchcont and Bchcont. The color temperature information forming device comprises the photoelectric converters 54, 55 and 56; the comparison part 69 and the converting part 70. The output terminal 71 is arranged to produce the R (red) channel control signal Rchcont and the B (blue) channel control signal Bchcont. These control signals are used by a process amplifier of the image pickup or sensing system which is not shown.

The photoelectric converters 54, 55 and 56 are arranged to photoelectric convert the R, G and B components of light which comes via a light receiving system arranged separately from the image pickup optical system and is diffused by a diffusing plate and filters (not shown). The photoelectric converters 54, 55 and 56 are integrating type converters such as the BASIS shown in FIGS. 5(a) and 5(b). The embodiment performs with these converters an accumulating action, i.e. an action to integrate electric charge obtained by photoelectric converting the incident light; a reading action, i.e. an action to read out the result of integration; a reset action, i.e. an action to initialize these converters by means of a reset signal. The outputs SR, SG and SB of the converters 54, 55 and 56 are supplied to the minimum value circuit 57. Within the circuit 57, there are provided transistors 60, 61 and 62 which are of the p-n-p type and are connected in parallel. Therefore, the output of the circuit 57 corresponds to the smallest of the values of the three input signals SR, SG and SB. The output of the circuit 57 is supplied to one of the input terminals of the comparator 63. The other input terminal of the comparator 63 is arranged to receive the reference voltage 64. The comparator 63 produces its output at an L level when the output SM of the minimum value circuit 57 is lower than the reference voltage VM and at an H level when the former is higher than the latter. The output of the comparator 63 is supplied to the data latch flip-flop (DFF) 65. The clock signal input terminal 66 of the DFF 65 is arranged to receive a horizontal synchronizing signal generated by the television horizontal synchronizing signal generator 67, because: Use of any clock signal that is not in synchronism with the synchronizing signal used for television tends to result in a beat noise appearing on a TV picture plane. The output of the DFF 65 is used as the reset pulse signal PRS for the photoelectric converters 54, 55 and 56.

Figure 11:
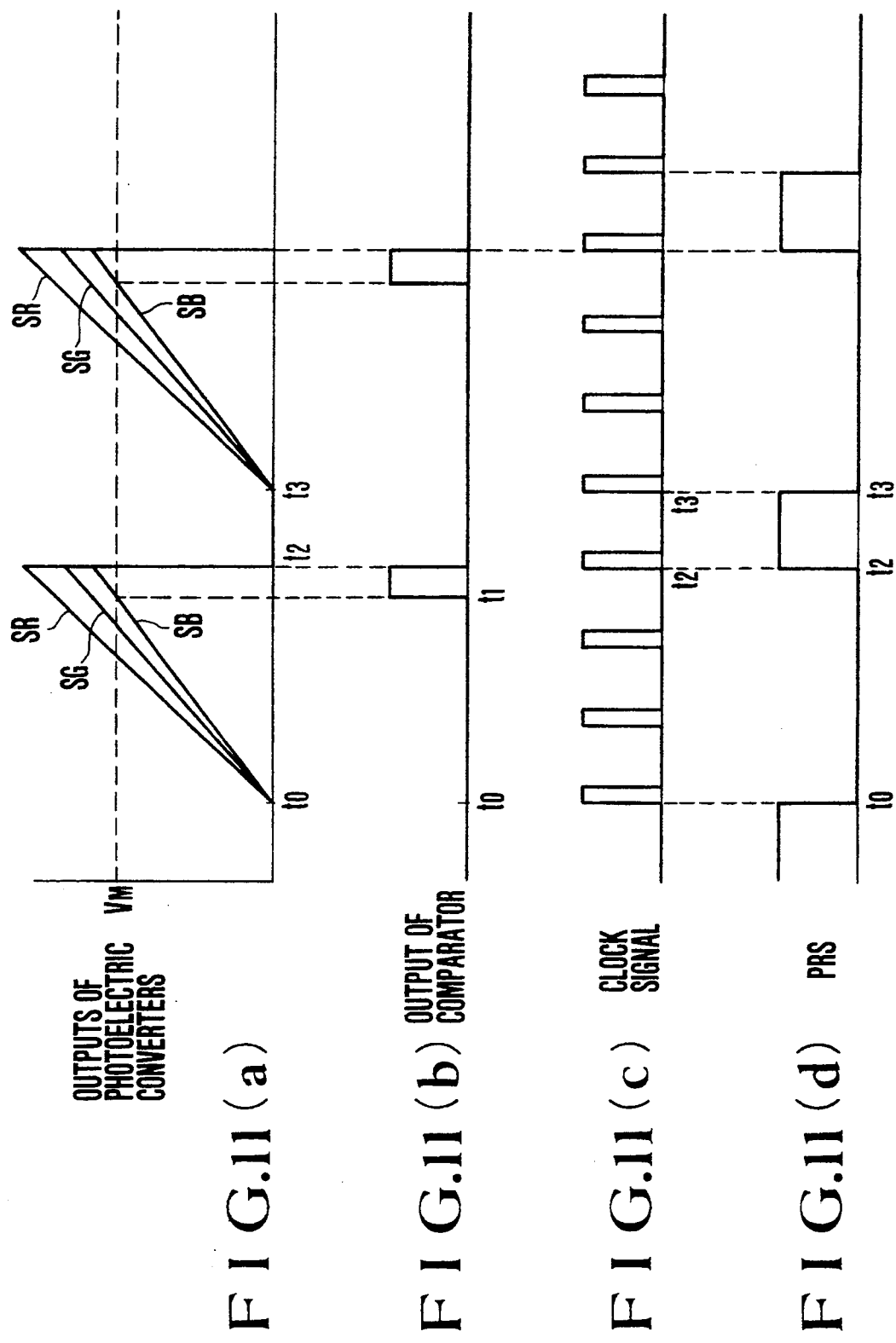
FIGS. 11(a) to 11(d) show in a timing chart the operation of the circuit of FIG. 10.

FIGS. 11(a) to 11(d) show the operation timing of the embodiment. FIG. 11(a) shows the output signals SR, SG and SB of the photoelectric converters 54, 55 and 56. A reference symbol VM denotes the reference voltage 64. FIG. 11(b) shows the output of the comparator 63. FIG. 11(c) shows the television horizontal synchronizing signal received as a clock signal for the DFF 65. FIG. 11(d) shows the output PRS of the DFF 65. Referring to FIGS. 11(a) to 11(d), the photoelectric converters 54, 55 and 56 are initialized by the output PRS of the DFF 65 and begins to perform their integrating actions according to the incident light with their outputs SR, SG and SB set at zero level at a timing point t0. When the smallest value SM detected by the minimum value circuit 57 which detects the smallest of the outputs SR, SG and SB (SM corresponds to SB of FIG. 11(a)) comes to exceed the reference voltage VM after the lapse of a period of time t1, the output level of the comparator 63 becomes an H level. After the output level of the comparator 63 becomes high, when a clock pulse is first received at a timing point t2, the output level of the DFF 65 becomes high. Then, a reset pulse (PRS) comes again to initialize the photoelectric converters 54, 55 and 56. The outputs SR, SG and SB of the converters are all at zero level under this condition at the timing point t2. Therefore, there obtains a state of SM<VM and the output level of the comparator 63 becomes low. After the output level of the comparator 63 becomes low, a clock pulse first received at a timing point t3 causes the output level of the DFF 65 to become low. The low level output of the DFF 65 releases the converters 54, 55 and 56 from their reset state to allow them to begin the integrating actions again.

Figure 12:
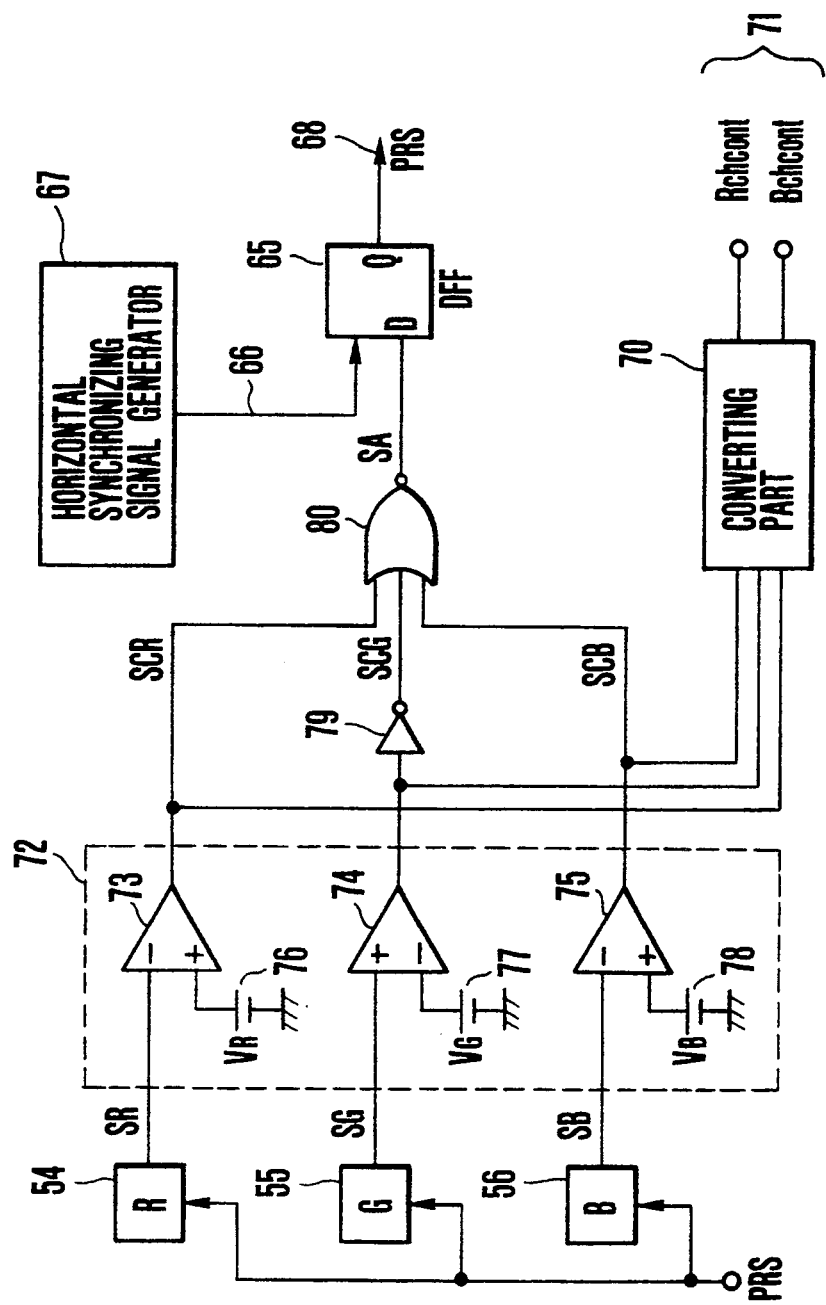
FIG. 12 is a diagram showing a fifth embodiment of this invention.

FIG. 12 shows a fifth embodiment of this invention. A reference numeral 72 denotes the comparison part of a color temperature information forming device. The part 72 includes comparators 73, 74 and 75 which are arranged to receive reference voltages 76, 77 and 78. The color temperature information forming device is provided with a converting part 70; an output terminal 71 arranged to produce R and B control signals Rchcont and Bchcont; a NOT gate 77; a NOR gate 80; a DFF 65; a television horizontal synchronizing signal generator 67; and an output terminal 68 for a reset pulse signal PRS.

Figure 13:
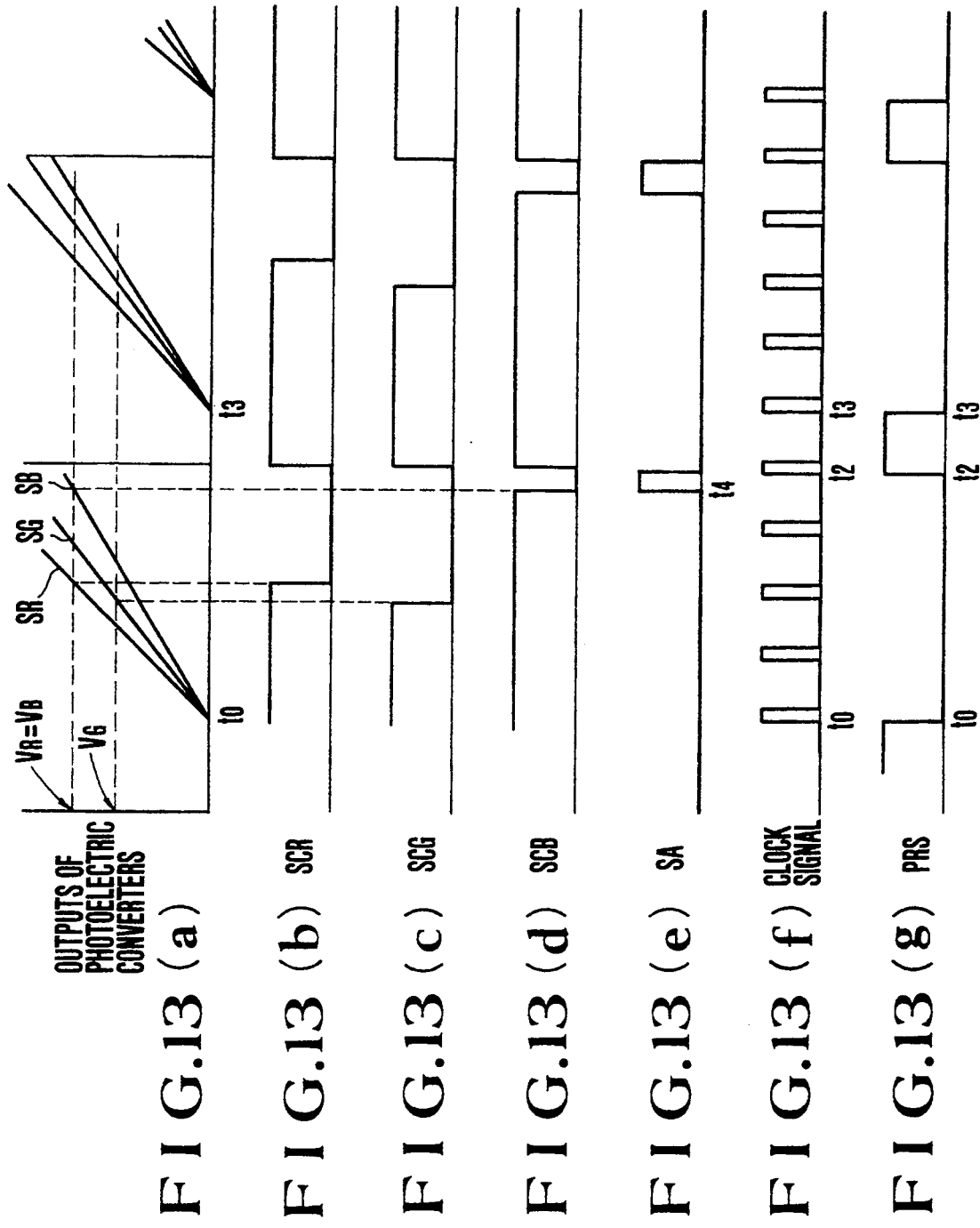
FIGS. 13(a) to 13(g) is a timing chart showing the operation of the circuit of FIG. 12.

The fifth embodiment differs from the preceding example of embodiment in that: The fifth embodiment has the reset time of the photoelectric converters arranged to be variable by means of signals produced from the comparison part 72. FIGS. 13(a) to 13(g) show the operation timing of the fifth embodiment shown in FIG. 12. The comparator 74 produces a low level output when the output SG of the photoelectric converter 55 is lower than the reference voltage 77 (or VG) and a high level output when the former is higher than the latter. Other comparators 73 and 75 are arranged to operate contrarily to the comparator 74. An output SCG which is shown in FIG. 13(c) is obtained by inverting the output of the comparator 74 by the NOT gate 79. Outputs SCR and SCB which are as shown in FIGS. 13(b) and 13(d) are obtained from the comparators 73 and 75 respectively. In the case of this embodiment, reference voltages VR, VG and VB for the comparators 73, 74 and 75 are in the following relation: VG<VR=VB. The output SA of the NOR gate 80 which is arranged to receive the outputs SCR, SCG and SCB is as shown in FIG. 13(e). When all the outputs SCR, SCG and SCB are at low levels, the output SA of the NOR gate 80 is supplied at an H level to the terminal D of the DFF 65 at a timing point t4 indicated in FIG. 13(e). Following this, the rest of operation is performed in the same manner as in the preceding example of embodiment shown in FIG. 10 and the reset signal PRS is obtained as shown in FIG. 13(g).

In accordance with the arrangement of this embodiment as described above, even in the event of a wide ranged illuminance of the object (having a dynamic range of about 86 dB), the dynamic range of signals to be processed within the color temperature information forming device is allowed to be small by controlling the reset time of the photoelectric converters. Therefore, a color temperature information forming device of a high degree of precision can be obtained with simple arrangement.

Further, in the fourth and fifth embodiments, the R and B channel control signals Rchcont and Bchcont at the converting part 70 can be produced, for example, in accordance with any of the manners employed in the first, second and third embodiments. Therefore, the details of the control signal producing method are omitted from the description given here.

Figure 14:
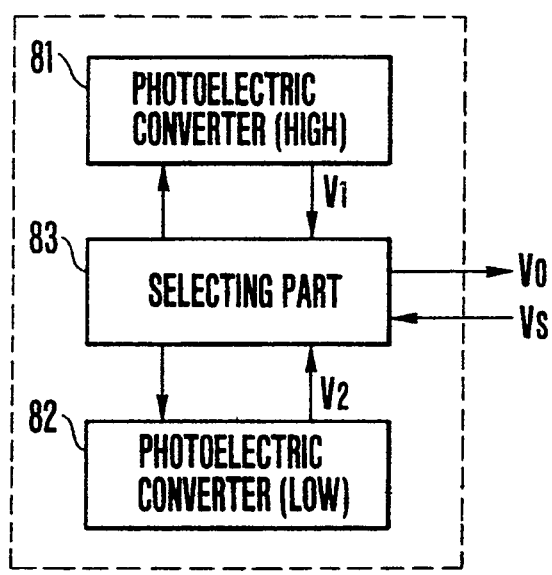
FIG. 14 is a schematic illustration showing in outline the arrangement of a photoelectric converter included in a color temperature information forming device arranged as a sixth embodiment of this invention.

FIG. 14 shows in outline the arrangement of a color temperature information forming device arranged as a sixth embodiment of this invention. The embodiment comprises a highly sensitive photoelectric converter 81 having adjusted sensitivity distribution, a low sensitivity photoelectric converter 82 and a selecting part 83 which selects one of the outputs V1 and V2 of the two photoelectric converters in accordance with a selection signal Vs. The output signal Vo of the selecting part 83 is produced to the outside of the device.

The selection signal Vs corresponds to the illuminance of the light incident on the photoelectric convertexes 81 and 82. This signal Vs may be either a detection signal obtained from illuminance detecting means discretely arranged or information on the result of illuminance detection obtained from the outputs of the photoelectric converters 81 and 82. The selecting part 83 selects the output V2 of the low sensitivity converter 82 according to the selection signal Vs and produces the output signal Vo in the event of an intense incident light. The part 83 selects the output V1 of the high sensitivity converter 81 and produces the output signal Vo in the event of a weak incident light. With the photoelectric converters of high and low degree of sensitivity thus arranged and a suitable one of the outputs of two different converters selected according to the illuminance of the incident light, a wide dynamic range can be obtained.

Further, by using a plurality of photoelectric converting elements of different sensitivity characteristics, a wide range of illuminance can be covered and a desired characteristic of the photoelectric converter is obtainable.

Figure 15:
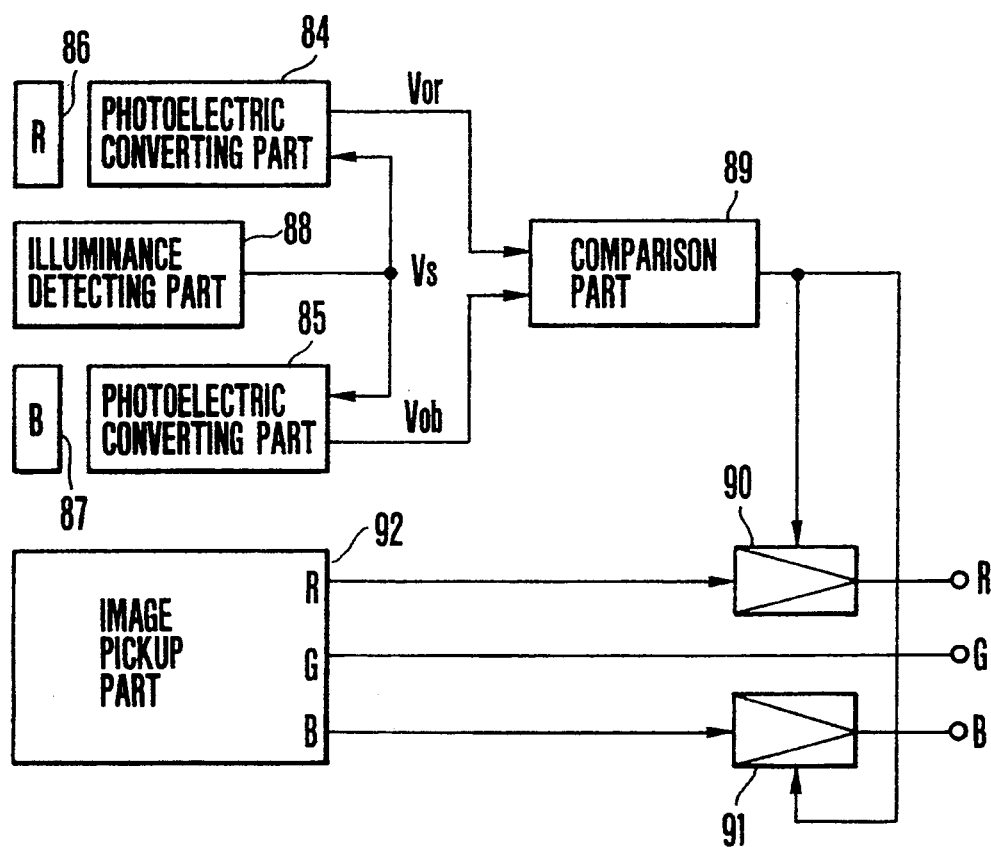
FIG. 15 is a diagram showing in outline an external automatic follow-up type white balance adjustment device as a modification example of the sixth embodiment shown in FIG. 15.

FIG. 15 shows by way of example and in outline the arrangement of an external automatic follow-up type white balance device to which the arrangement of the sixth embodiment is applied. This device includes a photoelectric converting parts 84 and 85 which correspond to the sixth embodiment shown in FIG. 14. The photoelectric converting part 84 includes a red (R) filter 86 and the other converting part 85 a blue (B) filter 87. As regards the selection signal Vs which is to be applied to the converting parts 84 and 85, a detection signal produced from an illuminance detecting part 88 which is discretely arranged serves that purpose.

The photoelectric converting parts 84 and 85 produce signals Vor and Vob representing the levels of red and blue components of the incident light. These signals Vor and Vob are supplied to and compared with each other by a comparison part 89. The result of comparison is supplied to a red color computing circuit 90 and a blue color computing circuit 91. Then, the gain of the red (R) output and that of the blue (B) output of an image pickup part 92 is adjusted to have the outputs R, G and B of the part 92 in the ratio of 1:1:1.

With the white balance device arranged in this manner, the photoelectric converting parts 84 and 85 which are separately arranged from the image pickup part 92 have a wide dynamic range, so that the white balance adjustment can be accurately accomplished.

Figure 5:
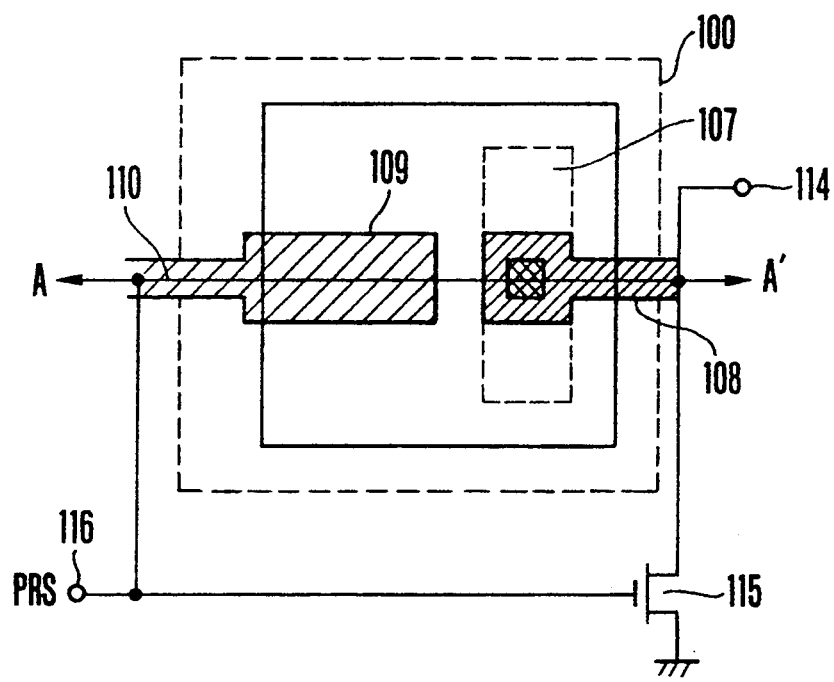
FIG. 5 (b) is a sectional view taken on the line A—A' of FIG. 5(a).
Figure 5:
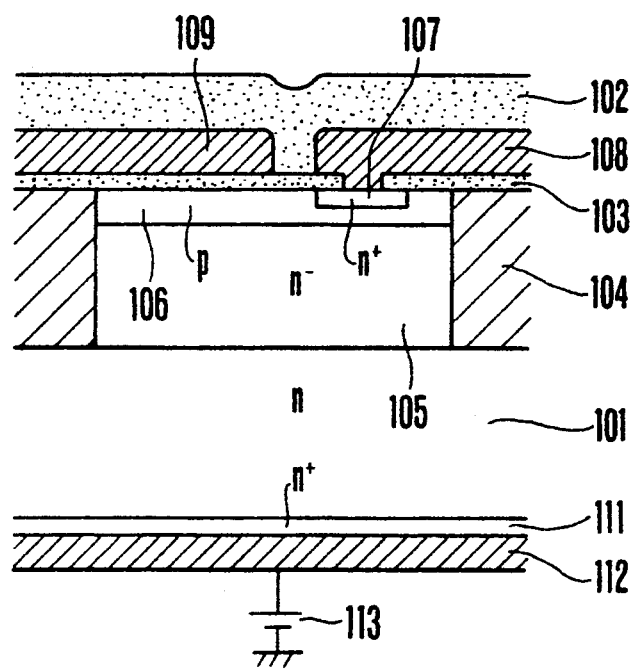
Figure 5:
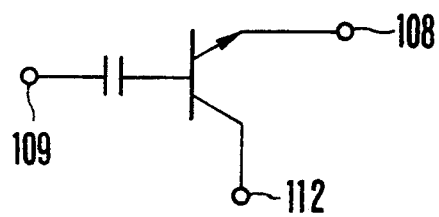

Further, with the BASIS which is arranged as shown in FIGS. 5 (a) to 5 (c) employed in the sixth embodiment, the sensitivity of the photoelectric converting part can be set within a range from 10 to $10^3$ or thereabout by adjusting either the area of the light receiving surface or a capacity in connection with the base of the BASIS or by providing a damping filter (ND filter) on the light receiving surface.

Referring further to FIGS. 5(a) to 5(c), although it is not shown, the base potential can be set at a given level when so desired either with an electrode obtained by providing a $p^{30}$ area in the base area 106 or by forming a resetting MOS transistor in the base area 106.

Figure 16:
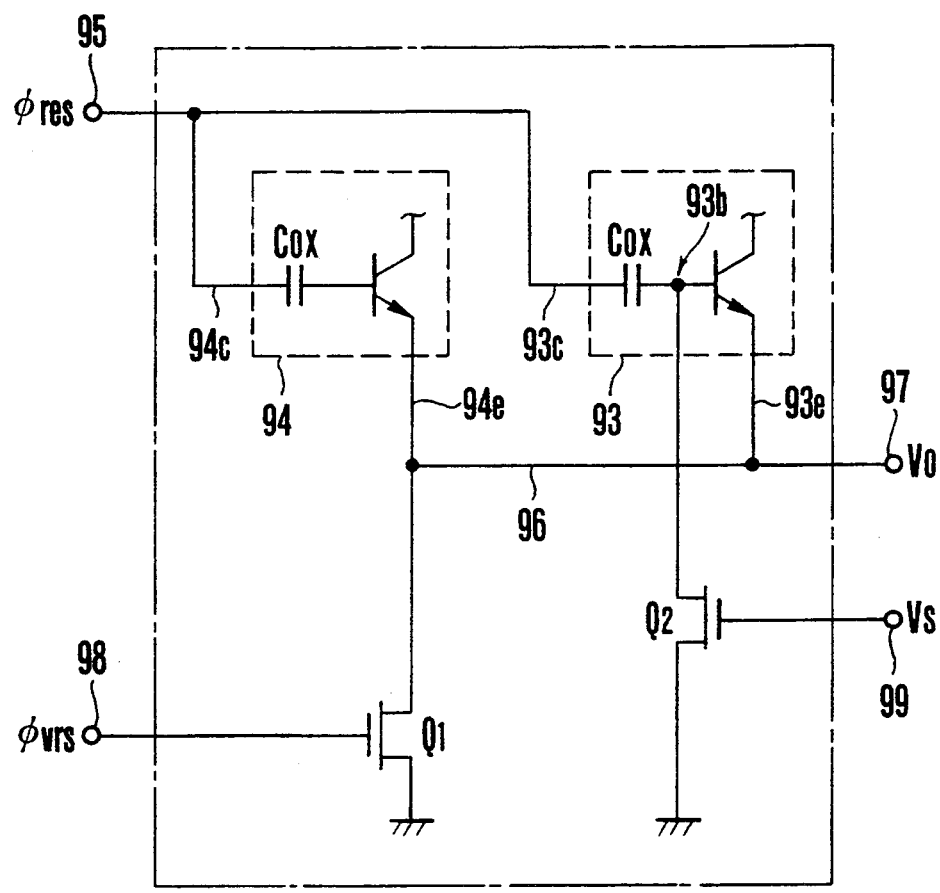
FIG. 16 is a diagram showing the details of the sixth embodiment.

FIG. 16 shows in more details the arrangement of this embodiment which employs the above stated BASIS. The embodiment is provided with a BASIS 93 which is set at a high degree of sensitivity and a BASIS 94 which is set at a low degree of sensitivity. The capacitor electrodes 93c and 94c of these BASIS's 93 and 94 are connected via a common line to a terminal 95. The terminal 95 is arranged to receive a pulse signal φres. The emitter electrodes 93e and 94e are connected via a common line 96 to an output terminal 97. The output terminal 97 is arranged to produce the output signal Vo of the selected BASIS. The common line 96 is grounded via a transistor Q1. The gate electrode of the transistor Q1 is connected to a terminal 98. The terminal 98 is arranged to receive a pulse signal φvrs.

The base area 93b of the high sensitivity BASIS 93 is grounded via a selection transistor Q2. The gate electrode of the transistor Q2 is connected to a terminal 99. The terminal 99 is arranged to receive the selection signal Vs from the illuminance detecting part which is discretely arranged to detect the illuminance of the light incident upon these BASIS's 93 and 94. The selection signal from the illuminance detecting part is arranged to turn on the selecting transistor Q2 when the incident light is intense and to turn it off in the event of a weak incident light.

In the event of a weak incident light, the selection transistor Q2 is caused to be in an OFF state by the selection signal Vs as mentioned above. Therefore, a greater amount of carrier is accumulated in the base area 93b of the high sensitivity BASIS 93 than in the other BASIS 94 according to the incident light. Accordingly, a high level output is obtained from the BASIS 93 by a reading action thereon. At that time, the transistor Q1 is kept in an OFF state by the pulse Signal φvrs. Then, the emitter electrodes 93e and 94e of the BASIS's 93 and 94 and the common line 96 are in a floating state. As a result, the higher of the two outputs appears on the common line 96. In this instance, the output of the BASIS 93 appears and is produced as the output signal Vo.

Next, in the case of an intense incident light, the selection transistor Q2 is in an ON state. Therefore, the base potential of the high sensitivity BASIS 93 is fixed to the ground potential level. The base potential of the low sensitivity BASIS 94 therefore becomes higher. In response to a reading action, the output of the basis 94 appears on the common line 96 and is then produced as the output signal Vo.

Every time the reading action comes to an end, the pulse φvrs turns the transistor Q1 on to ground the emitter electrodes 93e and 94e of the BASIS 93 and 94 and thus a reset action is performed by the pulse φres.

Further, if the base potential after the reset action is adequately set, a reading action can be performed concurrently with the accumulating action of each BASIS. In that instance, the gate electrode of the transistor Q1 is connected to the terminal 95 and the pulse φres is used as a reset pulse.

One of the outputs of the BASIS's 93 and 94 which have different degrees of sensitivity thus can be selected by the selection signal Vs. Therefore, the embodiment is capable of covering a wide range of illuminance with the sensitivity distributions of the two added together.

In the embodiment described, the high sensitivity BASIS 93 and the low sensitivity BASIS 94 are employed. However, the advantageous effect of the embodiment is likewise attainable by differently arranging a plurality of BASIS's with one selection transistor provided for each of the base areas of the BASIS's having higher degree of sensitivity. In other words, one of the selection transistors thus arranged is turned on as applicable according to the detection signal produced from the illuminance detecting part.

The photoelectric converter of this embodiment comprises, as mentioned above, a plurality of photoelectric converting elements of different degrees of sensitivity and the selection means for selecting the output of one of the photoelectric converting elements as desired. The embodiment is therefore capable of selecting the output of the photoelectric converting element having a higher degree of sensitivity in the event of, for example, a weak incident light or the output of the element having a lower degree of sensitivity in the event of an intense incident light, so that the photoelectric converting operation can be accurately accomplished for light of varied degrees of illuminance within a wide range of il luminance degrees.

Therefore, with the arrangement of the embodiment applied, for example, to the light receiving system of an external automatic follow-up white balance device, white balance adjustment can be accurately carried out over a wide dynamic range.

What is claimed is:

1. A color image pick-up apparatus, comprising:
   (a) image pick-up means for producing color image signals;
   (b) light sensing means for producing chrominance signals of plurality of kinds;
   (c) color temperature control means for producing color temperature control signals according to a binary combination of comparison results obtained by a binary gate circuit which receives comparison output signals obtained by comparing levels of said chrominance signals with respective predetermined reference levels; and
   (d) correcting means for correcting said color image signals according to said color temperature control signals.

2. An apparatus according to claim 1, wherein said image pick-up means includes a CCD.

3. An apparatus according to claim 1, wherein said chrominance signals include an R-signal, a B-signal and a G-signal.

4. An apparatus according to claim 1, wherein said correcting means includes an amplifier and is arranged to variably control the levels of said color image signals in accordance with said color temperature control signals.

5. A color image pick-up apparatus, comprising:
   (a) image pick-up means for producing color image signals;
   (b) light sensing means for producing chrominance signals of a plurality of kinds;
   (c) color temperature control means for producing color temperature control signals obtained by a logical operation of a logic circuit wherein said logic circuit receives comparison output signals obtained by comparing levels of said chrominance signals with respective predetermined reference levels; and
   (d) correcting means for correcting said color image signals according to said color temperature control signals.

6. An apparatus according to claim 5, wherein said image pick-up means includes a CCD.

7. An apparatus according to claim 5, wherein said chrominance signals include an R-signal, a B-signal and a G-signal.

8. An apparatus according to claim 5, wherein said correcting means includes an amplifier and is arranged to variably control the levels of said color image signals in accordance with said color temperature control signals.

* * * * *

UNITED STATES PATENT AND TRADEMARK OFFICE
CERTIFICATE OF CORRECTION

PATENT NO. : 5,351,080
DATED : September 27, 1994
INVENTOR(S) : Kenji Kyuma et al.

It is certified that error appears in the above-identified patent and that said Letters Patent is hereby corrected as shown below:

On the title page
Item [57], line 6. Change "accumultate" to -- accumulate --.

Col. 1, line 51. Change "Them" to -- Then --.

Col. 1, line 66. Delete "up".

Col. 2, line 24. Delete "of".

Col. 5, line 30. Change "photoelectric" to -- photoelectrically --.

Col. 5, line 44. Change "Other" to -- The other --.

Col. 6, line 31. Change "oust" to -- output --.

Col. 9, line 14. Delete "which is".

Col. 9, line 25. Change "act ion" to -- action --.

Col. 10, line 18. Change "t lining" to -- timing --.

Col. 10, line 51. After "capable" insert -- of --.

Col. 11, line 6. Change "photoelectric" to -- photoelectrically --.

Col. 11, line 14. Change "photoelectric" to -- photoelectrically --.

Col. 13, line 34. Delete "a".

Col. 14, line 1. Change "$p^{30}$" to -- $p^+$ --.

UNITED STATES PATENT AND TRADEMARK OFFICE
CERTIFICATE OF CORRECTION

PATENT NO. : 5,351,080
DATED : September 27, 1994
INVENTOR(S) : Kenji Kyuma et al.

It is certified that error appears in the above-identified patent and that said Letters Patent is hereby corrected as shown below:

Col. 15, line 24. Change "il luminance" to -- illuminance --.

Signed and Sealed this

Twenty-eight Day of February, 1995

*Attest:*

BRUCE LEHMAN

*Attesting Officer*     *Commissioner of Patents and Trademarks*